United States Patent
Kewitsch (10) Patent No.: US 7,079,320 B2
(45) Date of Patent: Jul. 18, 2006

(54) BANDWIDTH PROPERTIES OF LC-SLMS FOR TELECOMMUNICATION APPLICATIONS WITH PARTICULAR THIRD COMPENSATOR

(76) Inventor: Anthony S. Kewitsch, 515 Ocean Ave., #505-s, Santa Monica, CA (US) 90402

( * ) Notice: Subject to any disclaimer, the term of this patent is extended or adjusted under 35 U.S.C. 154(b) by 41 days.

(21) Appl. No.: 10/621,045

(22) Filed: Jul. 15, 2003

(65) Prior Publication Data

US 2005/0018117 A1    Jan. 27, 2005

(51) Int. Cl.
*G02B 27/10* (2006.01)
(52) U.S. Cl. ...................................... 359/618
(58) Field of Classification Search ................ 359/618
See application file for complete search history.

(56) References Cited

U.S. PATENT DOCUMENTS

| | | | |
|---|---|---|---|
| 6,373,614 B1 * | 4/2002 | Miller | 359/237 |
| 6,614,572 B1 * | 9/2003 | Kelly et al. | 359/238 |
| 6,671,085 B1 * | 12/2003 | So et al. | 359/341.42 |
| 2002/0149840 A1 * | 10/2002 | So et al. | 359/337.1 |
| 2003/0053173 A1 * | 3/2003 | Patel et al. | 359/156 |
| 2003/0190121 A1 * | 10/2003 | Luo et al. | 385/37 |

* cited by examiner

*Primary Examiner*—Frank G. Font
*Assistant Examiner*—Timothy L. Rude
(74) *Attorney, Agent, or Firm*—Jones, Tullar&Cooper, P.C.

(57) ABSTRACT

Intrinsic material and optical properties of liquid crystal units, such as variable response to wavelength and temperature variations, are accommodated in accordance with the invention by introducing at least a pair of wave plates of different thicknesses which, together with the retardation introduced by the liquid crystal, serve to broaden the wavelength of response in fashion which also athermalizes the response. Specific retardations and angles of inclination relative to the input polarization are employed for overcoming these nonlinearities.

6 Claims, 12 Drawing Sheets

BANDWIDTH PROPERTIES OF LC-SLMS FOR TELECOMMUNICATION APPLICATIONS WITH PARTICULAR THIRD COMPENSATOR

REFERENCE TO PRIOR APPLICATION

This application relies for priority on provisional application Ser. No. 60/393,529, filed Jul. 15, 2002 and entitled "Wavelength Flattened LC-SLMs for Telecommunications Applications" and patent application Ser. No. 10/209,879 filed Aug. 2, 2002 by A. S. Kewitsch et al. and entitled "Liquid Crystal Modulators and Polarization Diversity Optics for Optical Communications".

FIELD OF THE INVENTION

This invention relates to optical communications devices and methods and more particularly to improving the optical and other performance characteristics of liquid crystal spatial light modulators for use in optical communication systems.

BACKGROUND OF THE INVENTION

Next generation optical networks are focused on economically exploiting the inherent bandwidth of optical fiber. Optical routing, agile wavelength provisioning and wavelength management are key characteristics of these next generation communications systems. The ability to perform attenuation and switching on a per wavelength basis is an enabling technology which achieves enhanced network flexibility.

Optical communication systems impose a number of particular and demanding requirements on DWDM wavelength filters and network devices. The optical requirements, such as channel extinction and isolation, chromatic dispersion, polarization dependent loss, passband width, passband flatness and insertion loss are becoming increasingly demanding as data rates increase and channel spacings are reduced. For example, at 25 and 50 GHz separations, prior art filtering and add/drop components have difficulty in meeting the optical performance requirements of next generation all-optical networks. For these applications, cost, compactness and performance characteristics such as dynamic range and extinction ratio are of great importance. In addition the response time must also meet the performance criteria over a given range of temperatures.

Unique wavelength management functionality can be achieved by combining diffraction grating and liquid crystal array technology in a dynamic channel equalizer/blocker system. This approach allows completely independent attenuation and/or blocking control on a per channel basis for 25, 50 and/or 100 GHz channel spacings. The introduction of a dynamic multi-cell LC-SLM array to modulate the wavelength demultiplexed beams enables devices which perform switching and variable attenuation in a channel independent fashion.

At present, the performance of channel equalizers is limited by the fact that liquid crystal spatial light modulators commonly used for fiberoptic applications exhibit wavelength and temperature dependence. For visible display applications, compensator films have been developed to achromatize the liquid crystal response across the visible light spectrum. The performance requirements for this application include achromatic contrast (>20 dB) for a relatively wide spectral band of 400 to 700 nm. However, the numerous designs developed for display applications are not particularly relevant to the needs of telecom applications. For instance, dynamic switching and variable attenuation products demand >40 dB extinction in a wavelength independent fashion across the C, L, or S bands. These bands are approximately 35 nm wide, within the 1300 to 1700 nm wavelength range. The extension of visible display techniques to achromatize infrared LC-SLMs does not provide the performance required for these unique fiberoptic applications.

In the prior art, the relationship between the control voltage on each LC-SLM pixel and attenuation set point depends on the temperature T and wavelength $\lambda$; that is, V(pixel N)=V(pixel N, attenuation,T, $\lambda$). Functionally, the control processing required for each pixel requires several control inputs. This requires a lookup table to be implemented into the driver electronics to correct for these first order errors. The generation of the entries for this look-up table requires extensive optical testing under different drive voltage, temperature, and wavelength conditions. Since this four-dimensional parameter space cannot practically be sampled over a finite number of discrete intervals, the response must be interpolated to fill in the missing data. This interpolation further reduces the accuracy of the system performance. Therefore, the goal of this invention is to make V(pixel N)=V(attenuation) to first order. As a result, two options arise: the lookup table is not needed, or the lookup table is used to correct second order rather than first order errors. This second option provides much improved accuracy in controlling the attenuation of each pixel.

Numerous factors relating to the intrinsic properties of liquid crystals and compensators, their optical axes and orientations, and the retardations they introduce, are known to affect the response of a device in a network. A channel equalizer/blocker provides control of the attenuation/extinction on a per channel basis. Optical networks require that channel blocking be achieved to a >40 dB rejection level. This level of blocking places extreme demands on the precision in which the retardation of individual LC-SLM pixels must be controlled. Typically, a compensator plate is placed in front of the LC cell to properly bias the retardation by half wave ($\pi$ radians or 725 nm) in round trip. However, this compensator plate, in addition to the LC-SLM, introduces a well characterized sinusoidal wavelength dependence with free spectral range given by c/$\Gamma$, where $\Gamma$ is the retardation and c is the speed of light. For a half wave plate, $\Gamma=\pi$, and for a quarter wave plate, $\Gamma=\pi/2$.

An optimal liquid crystal cell design to realize variable attenuation and switching for dynamic channel equalizers is based on the reflective, counter propagating configuration described in an earlier U.S. patent application Ser. No 10/209,879, filed Aug. 2, 2002 by A. S. Kewitsch et al and entitled "Liquid Crystal Modulator and Polarization Diversity Optics for Optical Communications". This is the zero twist nematic, parallel aligned liquid crystal in the reflective electrically controlled birefringence (ECB) mode. This type of cell is driven by a square wave voltage signal of 4 to 20 KHz frequency at 0 to 10 volt amplitude. This elemental cell design alone provides maximum retardation at low voltage (i.e. 0 volts), and minimum retardation (i.e. <10 nm) at high voltage (>3 volts). The cells are typically 50 to 100 um wide along the array direction, as defined by the dispersion direction of the diffraction grating, and are 1 to 3 mm tall.

The total retardation of a reflective LC-SLM is the vector sum of the liquid crystal and the compensator plate retardation, multiplied by two because of the round trip reflection. For use of the cell in the parallel polarizer type amplitude modulator, the liquid crystal should provide between 0 and π radians of phase retardation (0 to half wave) in round trip. Therefore, the liquid crystal cell provides 0 to quarter wave retardation in a single pass. From a fault handling perspective, telecom applications may require, for fail-safe operation, that a variable attenuator/blocker provide nominally full transmission in the zero voltage or power off state. This requires in turn that the retardation is zero rather than quarter wave in the zero voltage state. To achieve this normally-on type response, a nominally quarter wave compensator in antiparallel alignment to the optical axis of the LC cell is typically placed in front of the LC-SLM to shift the total LC retardation downward by slightly more than half wave, which biases the net zero voltage retardation about zero. The optical axes of the quarter wave plate and the LC director are in precise parallel alignment to one another. Therefore, in the high extinction state, the retardation is provided almost exclusively by the compensator plate. This compensator plate is typically fabricated from quartz of 45 to 50 um thickness. In the low voltage state, the sum of the retardation of the LC-SLM and the compensator plate equals an integer multiple of a full wave, the multiple being typically zero or one. As described earlier, when the cell is aligned such that the fast axis of the compensator is parallel to the slow axis of the liquid crystal cell, then this multiple is zero.

The retardation in the high extinction state is provided primarily by the true zero order quartz compensator plate of birefringence (retardation) equal to quarter wave plus an additional amount of birefringence (e.g., 0.1 wave) to correct for the residual birefringence of the cell in the high voltage state. The thickness of this waveplate is typically 54 um for quartz. However, a zero order wave plate introduces significant wavelength dependence of the voltage required for extinction across the C-band or L-band. The voltage required to achieve high extinction can vary by 20% in a linear fashion from 1530 to 1565 nm.

Since the retardation is provided by the sum of the liquid crystal retardation and the compensator retardation, the temperature dependence of the cell is equal to the sum of the temperature dependence of the liquid crystal and the compensator. Liquid crystal materials typically exhibit larger thermooptic and thermal expansion coefficients than quartz. Therefore, it is advantageous if the retardation in the high extinction state is provided primarily by the compensator plate for all wavelengths. This can be achieved by utilizing the wavelength flattened compensator plate design described herein. In contrast, the compensator plate/SLM combination of the prior art produces an attenuation response which depends on wavelength, voltage, and temperature. The amount of retardation necessary to achieve the desired polarization transformation depends on the operating wavelength, so different wavelength channels require different voltage settings to achieve the same attenuation value. The wavelength dependence of extinction within the C band varies, for example, between 1565, 1545, and 1530 nm, which adds complexity in the look up table algorithms and drive electronics, compromising the precision in which the attenuation and extinction can be set across a wide range of temperatures and wavelengths. It also requires drive electronics which output a larger voltage range for the longer wavelength channels. This reduces the flexibility in the design of the overall system hardware, because drive electronics components are available for output voltages of 5, 8, 10, and 22 volts, wherein increasing the output voltage increases cost, size, power consumption and reduces the range of component selection.

SUMMARY OF THE INVENTION

The invention described herein includes novel LC-SLM designs which achieve wavelength flattened response and reduced temperature sensitivity. These advantages are attained by designing a wavelength flattened, athermal compensator which is placed in series with a reflective or transmissive LC-SLM element and consists of a series of two or more quartz wave plates. These wave plates optimally comprise low order waveplates, such as true zero order half and quarter wave plates. Their thicknesses are selected to provide exactly half and quarter wave retardation at the nominal center of the wavelength band of interest (e.g., for the C-band the center wavelength is 1547 nm). The optical axes of the wave plates are in precise angular alignment to one another and potentially to the optical axis of the liquid crystal. The optical axis of the liquid crystal is dictated by the rubbing direction, which defines the liquid crystal director orientation.

In one application, this LC element can be used to provide a wavelength flattened, athermal optical switch (e.g., 1×2, 2×2). Alternately, improved LC-SLMs in an array can receive individual wavelength beams from a wavelength dispersive element such as a grating or prism which separates a single multi-wavelength beam into multiple single wavelength beams. Each wavelength then maps to a different pixel on the LC-SLM. By controlling the voltage on each pixel, more directly because the compensation expedient simplifies the correction of variables, the optical characteristics of each channel can be independently tailored.

Thus in accordance with the invention the intrinsic properties of optical modulators such as liquid crystals and optical elements such as quartz which are relatively thermally and optically stable are employed, for their own properties and in relation to each other, to approach optimal properties for specific operating conditions. These properties include not only wavelength flattening and athermalization, but more specific operative goals such as high extinction in an individual device or in multiple devices in an array (channel blocking), full transmission in one device or an array, linear attenuation or modulation in analog operation. Components can be employed to best advantage in introducing retardation, as by orienting the optical axes of elements in relation to the polarization of incident light and each other so as to use the most stable properties of elements and/or simplify the electronic corrections that are needed. Thus, in accordance with the invention the compensator/LC device can be arranged to minimize the contribution of the temperature dependent LC birefringence and maximize the contribution of the temperature independent quartz with operating in the high extinction state. Conversely, when in the high extinction state the combination does not require active electronic feedback to maintain the operating conditions in range.

BRIEF DESCRIPTION OF THE DRAWINGS

A better understanding of the invention may be had be reference to the following description taken in conjunction with the following drawings in which.

DETAILED DESCRIPTION OF THE INVENTION

Figure 1:
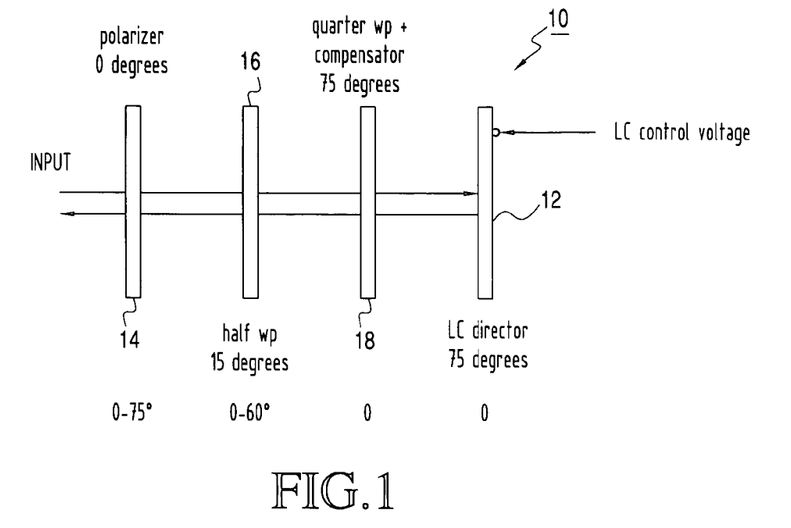
FIG. 1 is a generalized block diagram representation of a succession of waveplates and an LC cell in accordance with the invention showing examples of optical axis orientations.

A basic example of an improved LC-SLM unit 10 for optical communications is presented in FIG. 1, wherein an LC-SLM 12 of the zero twist nematic (reflective) type receives an input beam of predetermined wavelength through a series combination of a polarizer 14, half waveplate 16 and quarter waveplate plus a thickness for birefringence compensation 18, returning a modified reflected beam, through the same elements after variable retardation by a control signal. The detailed analysis of the wavelength flattening approach described in this application is developed by using a Jones matrix polarization analysis. The Jones matrix representing an arbitrary retardation plate is:

$$M(\Gamma, \lambda) = \begin{bmatrix} \mathrm{Exp}(-j\Gamma\lambda/(2\lambda_o)) & 0 \\ 0 & \mathrm{Exp}(j\Gamma\lambda/(2\lambda_o)) \end{bmatrix},$$

where the nominal center wavelength is $\lambda_o$ and the retardation at this center wavelength is $\Gamma$ radians. This retarder is oriented with its fast axis at some angle $\theta$ to the vertical reference direction. The Jones matrix for a retardation plate at an angle $\theta$ is:

$$M(\Gamma,\lambda,\theta) = R(-\theta)M(\Gamma,\lambda)R(-\theta),$$

where R is a rotation matrix given by:

$$R(\theta) = \begin{bmatrix} \cos(\theta) & \sin(\theta) \\ -\sin(\theta) & \cos(\theta) \end{bmatrix}.$$

The Jones matrix for a quarter waveplate-LC variable retarder-quarter waveplate is therefore:

$$M_{system} = M_{1/4wp}(\lambda,\theta_1)M_{LC}(\Gamma,\lambda,\theta_2)M_{1/4wp}(\lambda,\theta_1).$$

A true zero order quarter waveplate (e.g. waveplate 18) for the design wavelength of 1550 nm has a retardation of 1550 nm/4. When such a wave plate is placed at a nonzero azimuthal angle between parallel polarizers, it displays a free spectral range of $7.76 \, 10^5$ GHz; that is, its transmission is sinusoidal with a frequency period equal to FSR. This sinusoidal response produces an undesired wavelength dependence within the spectral range of interest (C band, for example). To wavelength flatten this device, additional retardation plates of thickness in integer multiples of the first waveplate 18 may be added in series to flatten the sinusoidal response in the vicinity of the maximum transmission wavelength. This is analogous to adding more Fourier terms in the expansion of a square wave, which produces a more faithful replica of a square wave. Dramatic improvement is achieved by adding a half waveplate 16 to the quarter waveplate compensator 18 and LC cell 12. The complete Jones matrix for this system, in double pass, is:

$$M_{system} = M_{1/2wp}(\lambda,\theta_2)M_{1/4wp}(\lambda,\theta_1)M_{LC}(\Gamma,\lambda,\theta_0)M_{1/4wp}(\lambda,\theta_1)M_{1/2wp}(\lambda,\theta_2).$$

The wavelength, voltage and temperature dependences of the modulator can be derived from this relationship and compensated for. By evaluation of the transmission response of this system and by numerically optimizing the waveplate angles to produce a given level of flatness within the C band, the target angles $\theta_1$, $\theta_2$, $\theta_3$ for the flattening waveplate, compensator, and LC optical axes respectively, can be determined. In practice, the addition of one waveplate may be adequate to achieve the necessary flatness within the C band spectral window; however, in general, additional waveplates can be cascaded to further improve the wavelength flatness.

A goal of the present invention is to provide an LC-SLM unit whose extinction versus voltage (or equivalently retardation) response is independent of wavelength. In the particular solution using an additional half wave plate, illustrated in FIG. 1, the wavelength responses precisely overlap across the entire C-band. The relative orientations of the wave plates and LC-SLM to give this performance are described in detail below.

Different Application Requirements for Liquid Crystal Units

In optical communications, particularly in WDM systems, a number of liquid crystal cells will be used in parallel to provide multiple concurrent controls, as with blockers and switches, and individual adjustments, such as for dynamic equalizers, attenuators, and modulators. In some instances, the efficiency with which signals are extinguished will be of primary importance, while in others the degree of resolution achieved in modifying a signal will be of paramount concern. The elements which work with a liquid crystal cell can profoundly affect the results achieved for different circumstances, and the present application is concerned with best utilization of the devices under different circumstances.

EXAMPLE 1

Wavelength Flattened LC-SLM with Thin Compensator Plate

Figure 2:
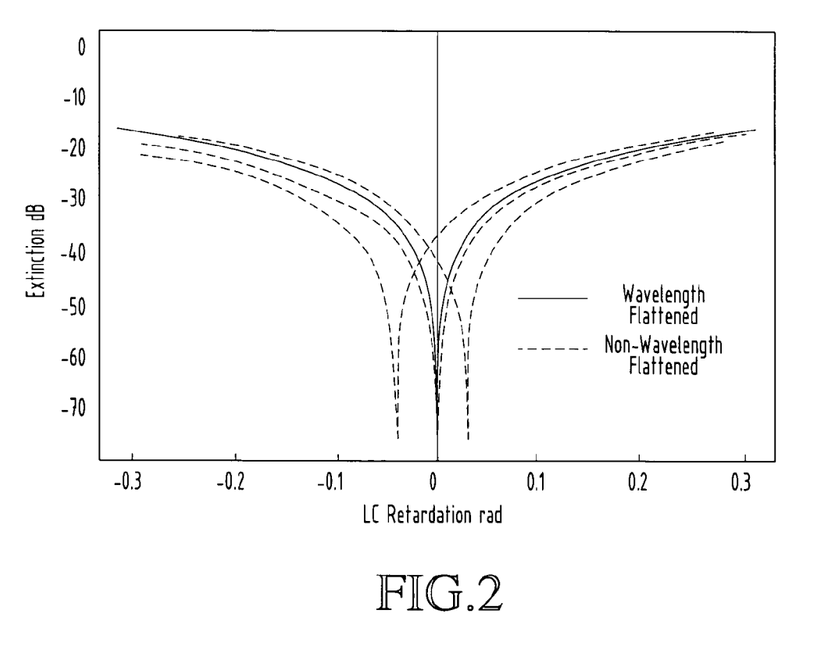
FIG. 2 is a graph of extinction vs. retardation variations for a wavelength flattened LC-SLM in solid lines versus non-wavelength flattened LC-SLM unit.

For a wavelength flattened cell 16, the orientations of the waveplates and the optical axis of the LC-SLM are noted in FIG. 1. In general, only the relative angles of the elements are relevant. If the input polarization is maintained at 0 degrees, then the angle of the fast axis of the half wave plate 16 is 15 degrees, the angle of the fast axis of the quarter wave plate 18 is 75 degrees, and the angle of the slow axis of the LC-SLM 12 is 75 degrees. Typically, the polarization of the beam as it enters the modulator subassembly is aligned at either 0 (90) degrees or 45 (−45) degrees, as determined by the polarizing element 14. The polarizer 14 orientation establishes a reference angle, to which the orientations of the associated wave plates 16 and 18 and the rubbing direction of the LC cell 12 are related. The contrast in linearity of wavelength response between a wavelength flattened unit (solid line) and a non-wavelength flattened unit (dotted line) is evident in the curves of FIG. 2.

The voltage corresponding to the zero extinction (full transmission) state also exhibit wavelength dependence, albeit to a lesser degree. The retardation in this state is typically 0 nm or an integer multiple of the operating wavelength. If the retardation is zero, this state does not exhibit the typical wave plate wavelength dependence. This is achieved when the fast axis of the quarter wave plate 18 is aligned antiparallel to the slow axis of the LC-SLM 12. The wavelength dependence is then determined by the material dispersion characteristics of the quartz and LC materials, which are generally very small. In this case, wavelength flattening of the zero extinction state is not necessary. Therefore, wavelength flattening improves the performance in the high extinction state rather than the inherently wavelength flat full transmission state.

Figure 4:
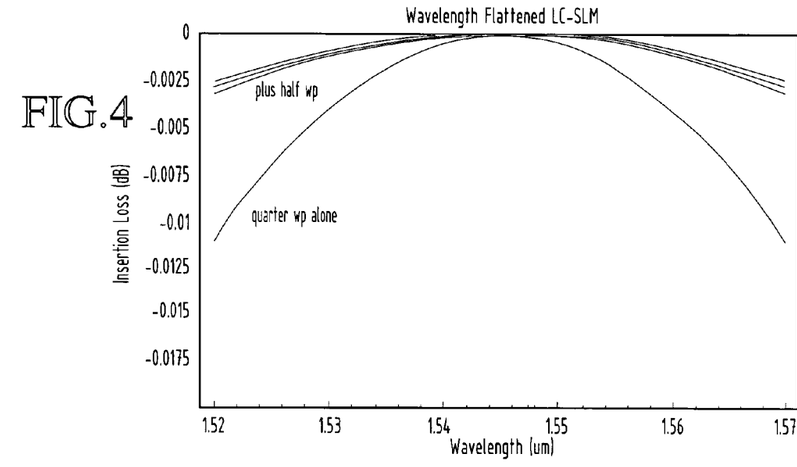
FIG. 4 is a graph of insertion loss vs. wavelength for a wavelength flattened LC-SLM, when a quarter waveplate is used alone or in conjunction with a half waveplate.

Alternately, if the total retardation of the cell at zero voltage is nominally full wave (~1550 nm), then the full transmission state does exhibit the wavelength dependence arising from the full wave plate. This occurs when the fast axis of the quarter wave plate is aligned in parallel to the fast axis of the LC. In this configuration, the wavelength dependence can also be dramatically reduced by the addition of that same half wave plate used to flatten the high extinction state. The improved flattening for an effective full wave plate is evident from FIG. 4, but the best solution to achromatize the high transmission state is simply to utilize the parallel alignment of fast and slow axes.

Figure 3:
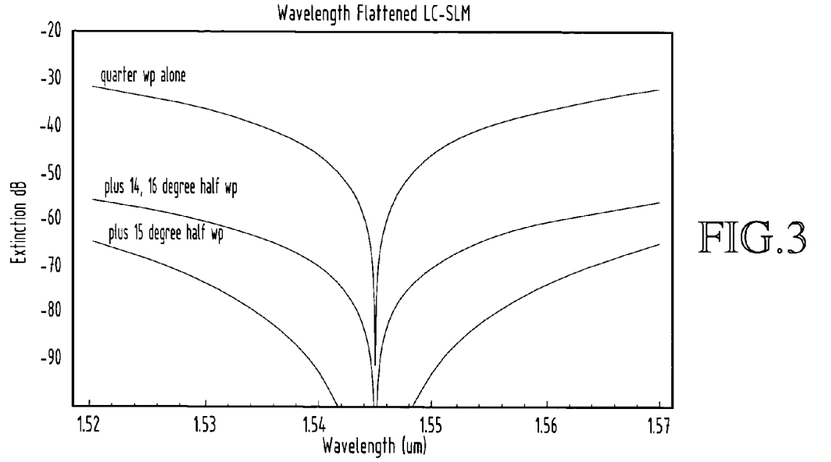
FIG. 3 is a graph of extinction vs. wavelength variations for a wavelength flattened LC-SLM utilizing different waveplates.

FIG. 3 illustrates the wavelength variation of extinction for different compensator plate combinations. To maintain the extinction (for a fixed amount of retardation or voltage on the LC) above 45 dB across the entire C band requires that the half wave plate 16 be oriented at between 14 and 16 degrees to the incident polarization angle. While the extinction still exhibits a small amount of wavelength variation, once the extinction lies above 45 dB for all wavelengths, these variations are sufficiently small such that the cell can be considered to be wavelength flattened, since the response is uniform to better than 0.004%.

Figure 5:
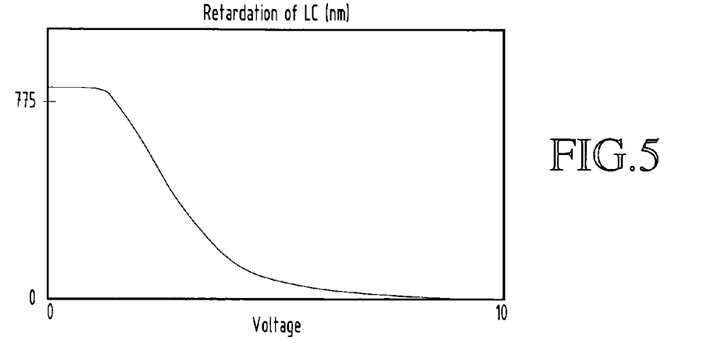
FIG. 5 is a graph of response for a liquid crystal in terms of nanometers of retardation with relation to drive voltage.

The typical double pass birefringence of an LC cell alone in reflection is illustrated in FIG. 5. This cell is designed to provide half wave retardation at a nominal center wavelength of 1550 nm. At high voltage, while the bulk of the LC is in the homeotropic orientation, the residual birefringence is typically 10 to 100 nm, arising from the pinning of the liquid crystal molecules in contact with the alignment layer. At low voltage, the birefringence is slightly larger than half wave (>775 nm). It is necessary that the net retardation varies by a span in excess of 775 nm to ensure that the high transmission state is lowest loss and the high extinction state achieves maximum rejection. This is achieved by shifting the birefringence curve downward in retardation such that the response passes through zero nm. A thin compensating plate or film provides this additional −10 to −100 nm of birefringence. The fast axis of the compensator should be aligned to the slow axis of the LC. The resulting retardation response is illustrated in FIG. 6.

Figure 6:
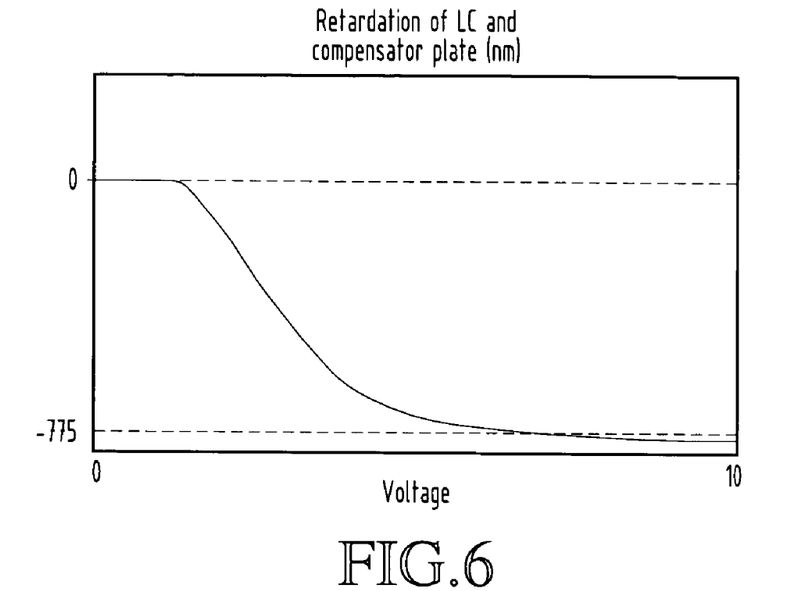
FIG. 6 is a graph of retardation of a liquid crystal and compensator unit, in accordance with the invention, in relation to drive voltage.
Figure 7:
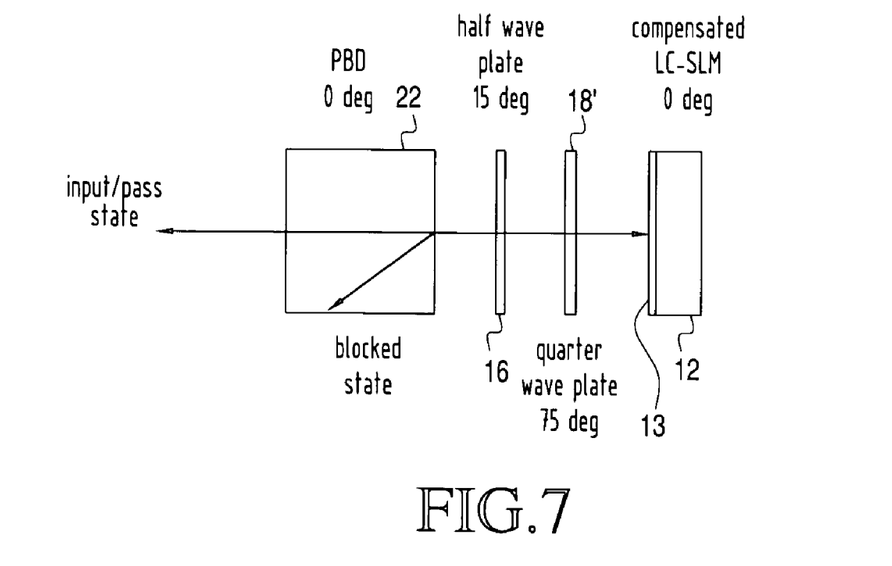
FIG. 7 is a block diagram of a unit employing a polarization beam displacer (PBD) with a compensated LC-SLM employing a quarter waveplate and a half waveplate.

A compensated cell having a response of the type illustrated in FIG. 6 can be configured as a wavelength flattened, normally-on variable attenuator and/or switch by using the modulator subassembly illustrated in FIG. 7. Note that the reflective LC-SLM 12 with a compensator 13 is effectively positioned between two quarter wave plates 18', a configuration which serves as a variable rotator. That is, a linear state of polarization input to the quarter wave plate 18' is rotated to a different linear state of polarization at the output of the quarter wave plate 18', by an angle dependent on the amount of LC retardation. This rotation characteristic is independent of the optical axis direction of the LC variable retarder 12. An input polarizer 22 rejects that component of the polarization not parallel to 0 degrees by displacing it downward in the case of a polarization beam displacer (PBD) 22, or by absorbing the component as in the case of a dichroic polarizer such as polarcor. The variable rotation is therefore transformed to variable attenuation.

The optical axis alignment of the polarizer, half wave plate, and quarter wave plate must be maintained to within approximately 0.1 degree of the optimal to achieve >45 dB extinction across the entire wavelength band of interest. However, the optical axis alignment of the LC relative to this input optical system is not as critical, because the polarization incident on the LC-SLM is nearly circular in its ellipticity.

Alignment and Assembly Methods

The insensitivity of extinction ratio on the angle between the LC director and the flattening waveplate allows the polarizer-wave plate subassembly to be aligned off-line to achieve high extinction, independent of the LC. This provides potential advantages from a manufacturing perspective. For example, for alignment purposes the LC may be replaced by a mirror. The polarizer can be fixed and mounted at the nominal 0 degree orientation. The half wave plate and quarter wave plate are aligned to their nominal positions using a polarimeter, for example. The polarimeter provides measurement feedback regarding the state of polarization. The half wave plate is adjusted until the linear polarization is rotated 30 degrees, and the quarter wave plate is adjusted until the polarization is converted to elliptical polarization. The bare LC cell/mirror is next inserted and aligned to optimize the strength of the signal back reflected into the input collimator. Fine corrections to the wave plate azimuthal angles are performed as needed until the back reflection is suppressed to below the −45 dB level. That is, the extinction is adjusted to the >40 dB level. The wave plates can then be permanently fixed in place. This subassembly is cured and aged independent of the LC subassembly, and retested as needed to confirm that the alignment and extinction have been maintained.

Figure 8:
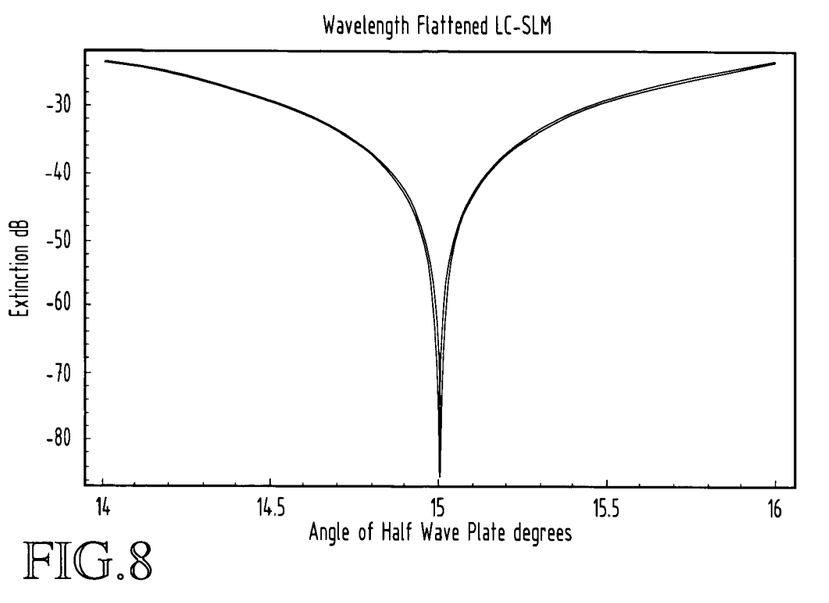
FIG. 8 is a graph of the extinction response of a wavelength flattened LC-SLM in terms of extinction for different angles of a half waveplate.
Figure 9:
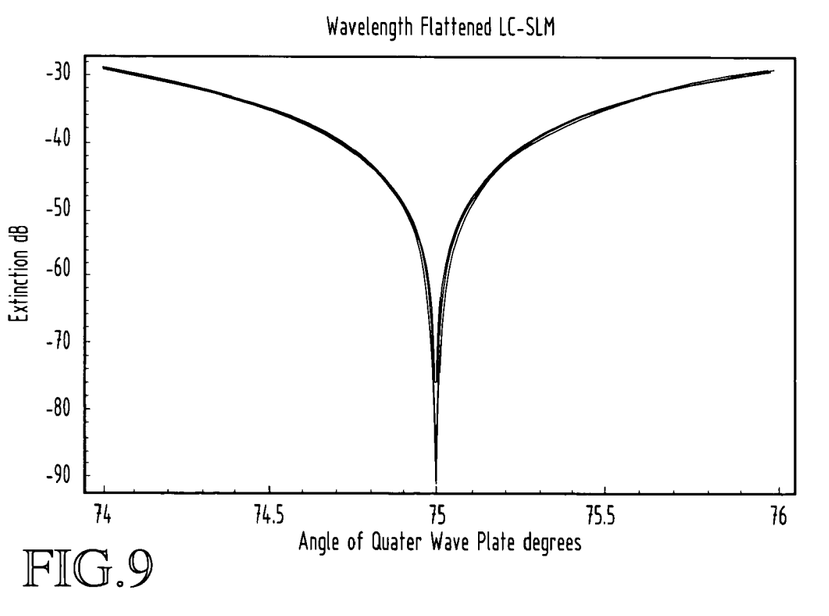
FIG. 9 is a graph of the extinction response of a wavelength flattened LC-SLM in terms of extinction for different angles of a quarter waveplate.

To achieve the target level of wavelength flattening (i.e. maintain extinction >45 dB across the entire C-band), the angular tolerance of the half wave plate optical axis is +/−0.1 degree (FIG. 8), while the angular tolerance of the quarter wave plate optical axis is +/−0.15 degrees (FIG. 8). FIGS. 8 and 9 depict responses at wavelengths of 1.530, 1.545, and 1.565 um. The fact that all three wavelength responses overlay one another demonstrates the wavelength independent optical characteristic. All wavelengths in between these wavelengths overlay in a similar fashion.

EXAMPLE 2

Wavelength Flattened LC-SLM without Thin Compensator Plate

Figure 10:
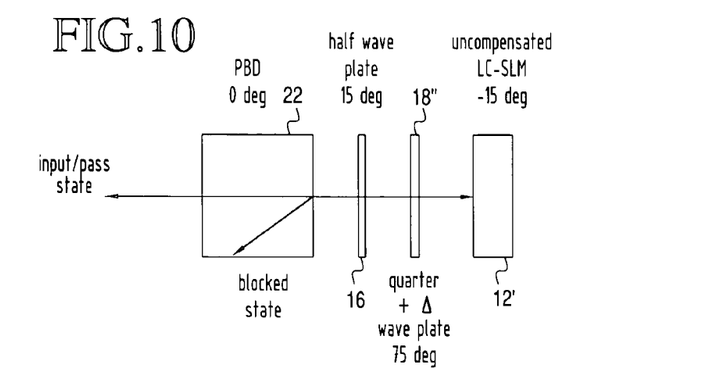
FIG. 10 is a block diagram of a birefringence uncompensated LC-SLM used with a polarization beam displacer and an intervening quarter waveplate and half waveplate.
Figure 11:
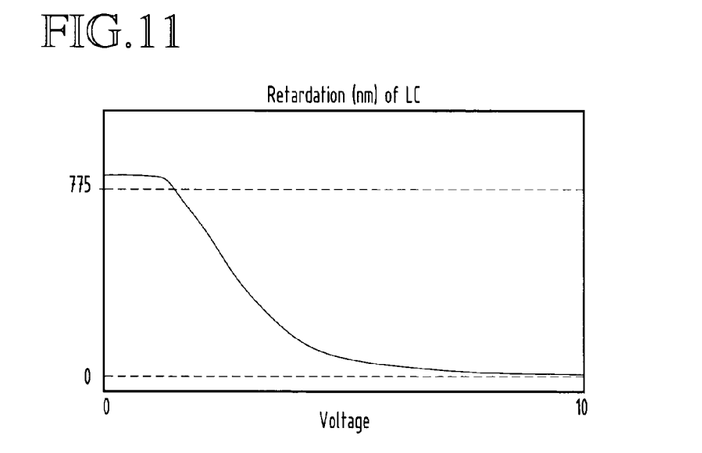
FIG. 11 is a graph of retardation in nm, introduced by a liquid crystal in relation to control voltage.
Figure 12:
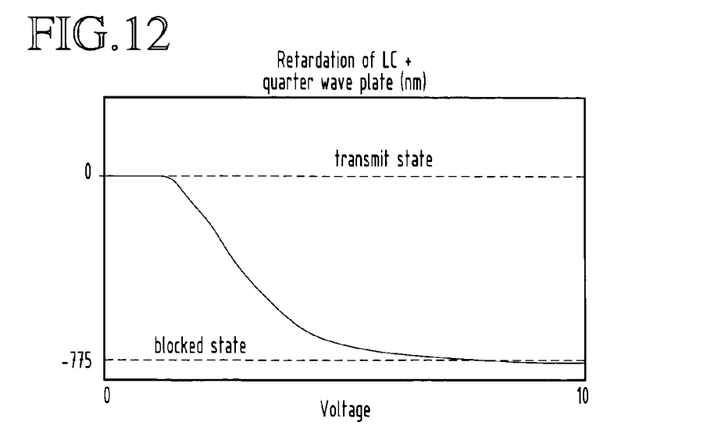
FIG. 12 is a graph of the retardation in nm introduced by a liquid crystal and quarter waveplate in relation to voltage.

In an alternate embodiment, FIG. 10, the compensator element can be incorporated into the quarter wave plate by making the quarter wave plate 18" thicker. The quarter wave plate 18" retardation is increased by the amount needed to shift the LC retardation response of FIG. 11 to that of FIG. 12. The fast axis of the quarter wave 12" plate is optimally aligned parallel to the slow axis of the LC-SLM 12'. A typical quartz quarter wave plate 18" at 1550 nm is 45 um thick. To add approximately 50 to 100 nm of retardation, about 5 to 10 um of additional quartz is needed. Therefore, the combination quarter wave plate and compensator is about 54 um thick. This compensation approach requires that the optical axes of the LC-SLM 12' and compensating quarter wave plate 18" be parallel to one another, and be aligned at 60 degrees to the half wave plate 16. For a polarizer or PBD 22 oriented at 0 degrees, the LC-SLM 12' and quarter wave plate 18" should both be aligned at 75 degrees (FIG. 10).

Alternate Method

Figure 13:
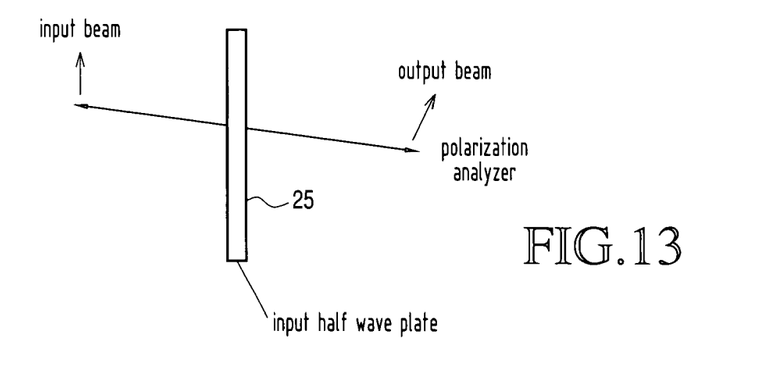
FIG. 13 is a view showing the relation between an input beam and output beam in a polarization analyzer employed in alignment methods in accordance with the invention.

To achieve high extinction and achromatic optical characteristics, precise positioning of the birefringent elements and the LC-SLM is necessary. The alignment is facilitated by the use of an in-line polarization analyzer or polarimeter which analyzes the state of polarization as each optical element is placed into the assembly. The input beam is provided by a fiber-to-free space collimator, for instance, with a beam spot size of 0.5 mm. A vertical polarization reference is established by placing a fixed polarizer after the input collimator. The state of polarization of this probe beam is then monitored to determine the optical axis orientations of the waveplates and polarizer as they are placed into the subassembly, as depicted below in FIGS. 13-15.

Figure 14:
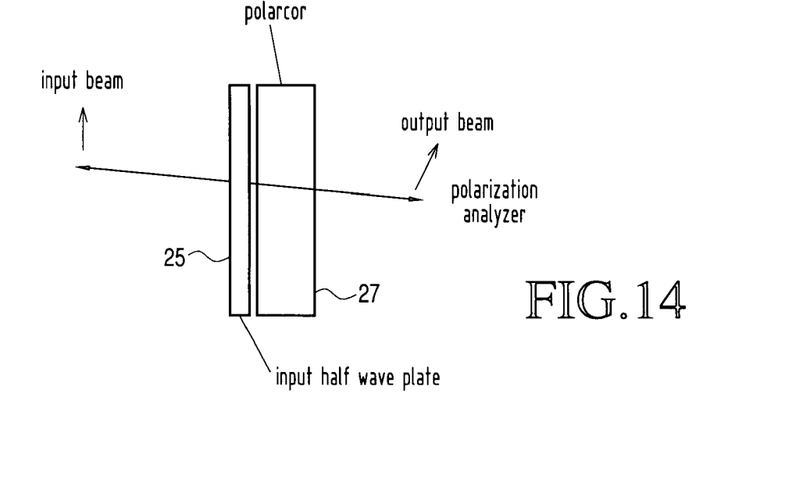
FIG. 14 depicts a step in alignment of polarization in accordance with the method.

A vertically aligned, linear state of polarization is input into the wave plate compensator subassembly. The input half wave plate 25 (FIG. 13) rotates the polarization to −30 degrees with respect to the vertical. This is achieved by inserting the half wave plate 25 with an azimuth angle of −15 degrees. Next, to convert the variable polarization rotation provided upon reflection from the LC-SLM into variable attenuation, a polarcor polarizer 27 is positioned at an orientation of −30 degrees to the vertical (FIG. 14).

Figure 15:
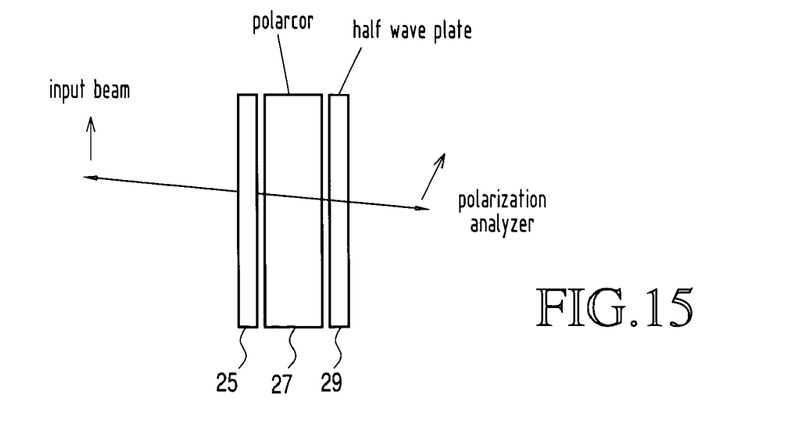
FIG. 15 depicts the use, in the method, of elements at various angles for variable attenuation and/or phase tuning.
Figure 16:
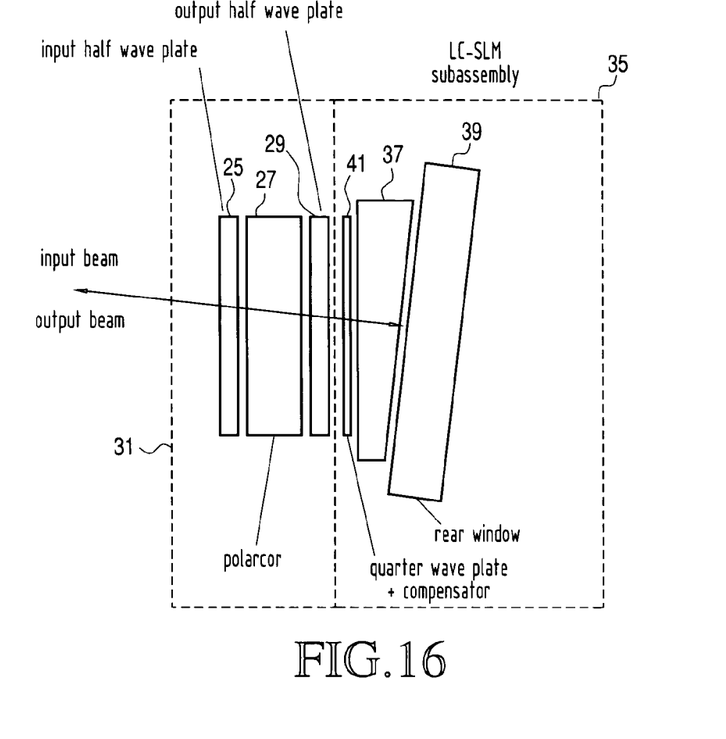
FIG. 16 is a side view of an LC-SLM subassembly with wavelength flattening as employed in an LC array.

Then, second half wave plate 29 is positioned at −15 degrees to rotate the linear state of polarization back to 0 degrees, as illustrated in FIG. 15 and form a compensator subassembly 31 as in FIG. 16. Note that it is advantageous if the wave plates and polarcor are not bonded together using optical cement, as the polarcor can heat up locally for channels in the blocking state. This heat can potentially degrade the optical cement in these regions. In addition, the first half wave plate 25 may be used for phase tuning if it is mounted on a separate carrier. Phase tuning is performed to align the frequency response of the filter to the standard ITU channel plan.

Figure 17:
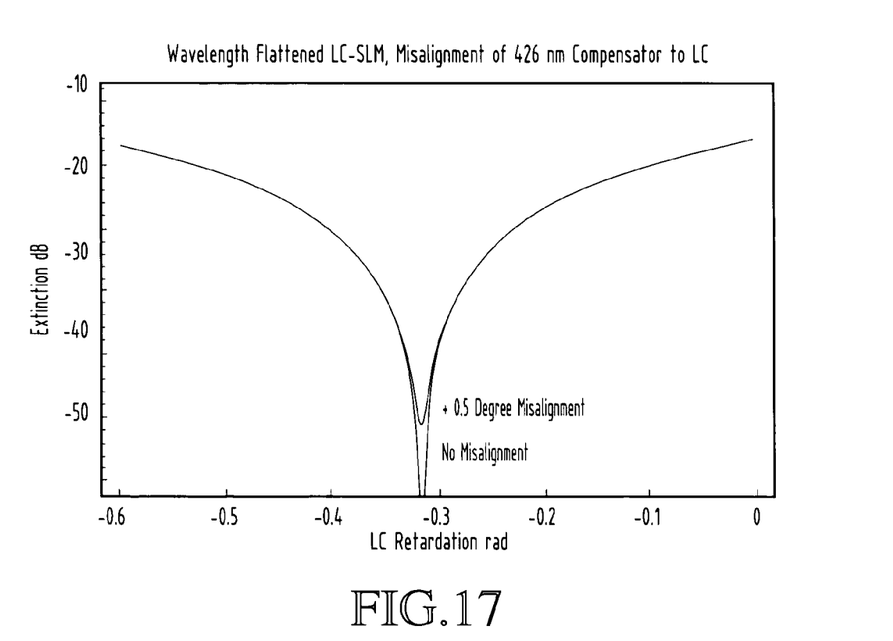
FIG. 17 is a graph of extinction vs. retardation characteristics for a wavelength flattened LC-SLM having different degrees of misalignment.

The LC-SLM subassembly 35 (FIG. 16) that is to be associated may be aligned off-line to ensure that the quarter wave plate/compensator fast axis is precisely aligned at 90+/−0.5 degrees to the fast axis of the LC. FIG. 17 illustrates the slight reduction in extinction ratio for a 0.5 degree misalignment. The relative angle between the two elements can be fine tuned by optically monitoring and maximizing the extinction ratio. This procedure is complicated by the fact that the LC retardation has to also be precisely set to achieve high extinction. Therefore, the LC-SLM 39 must be driven to the proper drive voltage during the alignment procedure. This is typically performed by utilizing an automatic, software assisted search procedure. Once an extinction ratio in the range of 40 to 50 dB is attained, the relative angle between the components is permanently fixed in place. This compensator 31 is typically optically cemented to the front face of the LC-SLM subassembly 35.

Next, the wave plates and polarcor subassembly 31 is aligned relative to the LC-SLM element 39. Again, the relative angle between the two assemblies can be fine tuned by optically monitoring and maximizing the extinction ratio. The mounting is typically achieved by tacking the parts in their aligned positions with uv epoxy, followed by thermal epoxy and/or laser welding for permanent attachment. This particular assembly 30 is then ready to be inserted as a unit into the reflective type channel equalizer. Similar alignment procedures apply for transmissive type elements. Note that the input half wave plate 25 may be de-mounted later in the process and rotated about the vertical axis to facilitate phase tuning. This adjustment can be achieved without compromising the extinction ratio because the polarcor and output half wave plate, which define the input state of polarization, remain fixed relative to the LC-SLM subassembly.

EXAMPLE 4

LC-SLM Array

The previously referenced Kewitsch et al. patent provides an example of an advanced LC-SLM modulator array and system for precise and high efficiency manipulation of the channels of a WDM configuration. In this arrangement, as shown in FIG. 16, an LC-SLM 35 unit which represents a single channel of a multichannel array dispersed in the vertical direction relative to the paper includes, within the subassembly 35, a wedge 37 immediately in front of the liquid crystal module 39 and after a frontal quarter wave plate and compensator 41. The input beam is a single wavelength beam derived from a WDM input by diffractive optics beam dispersing system and directed, by polarization optics, as described in the prior application, at a small angle of inclination to the receiving face of the liquid crystal cell. As described in the previously referenced application, for high efficiency polarization sensitive optics is used in a way which introduces slight height differentiations of the incoming and outgoing beam paths. However, within the compensator 31, wavelength flattening is accomplished, in relation to the optical surfaces in the LC-SLM subassembly 39, by a pair of half wave plates 25, 29 on the opposite sides of a polacor element 27, as described above in conjunction with FIG. 15.

Figure 18:
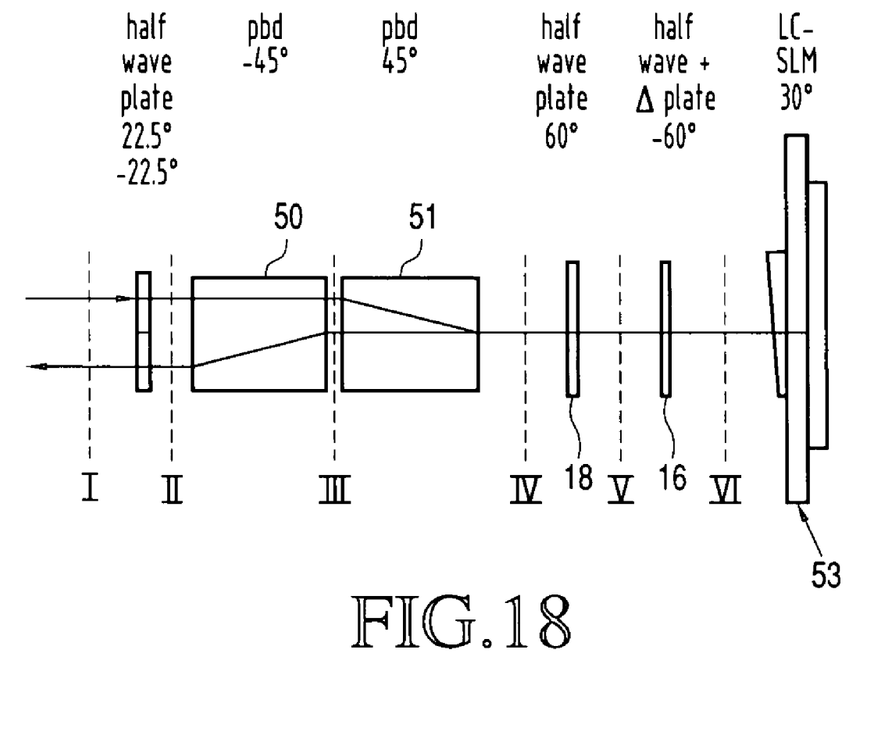
FIG. 18 is a side view of use of a wavelength flattened LC-SLM used in conjunction with a grating based spectrometer.
Figure 19:
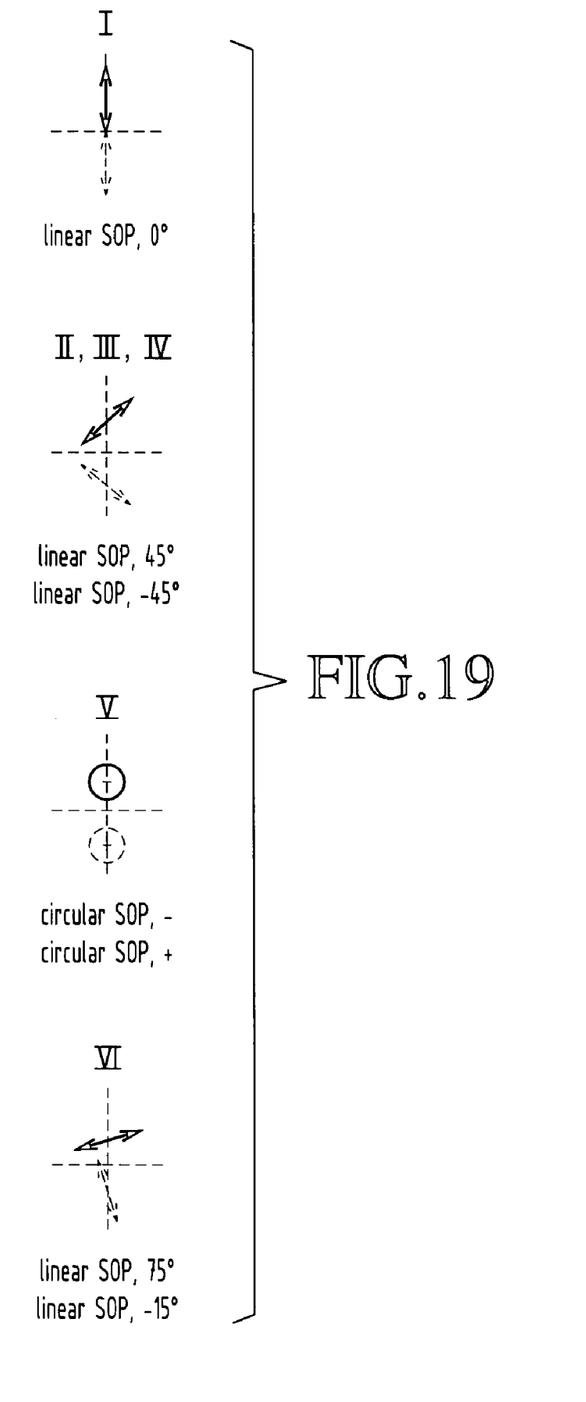
FIG. 19 is a series of graphs of linear and circular states of polarization that occur in the beams transmitted through the unit of FIG. 19.

For grating-based spectrometers in which the capability of processing and redirecting the rejected signal (rather than extinguishing in the polarizer) to a displaced beam path/output collimator is desired, a different design of wavelength flattening optics may be preferred. The relative angles between the wave plates 16, 18 remain the same, but the reference frame of the total optical system is rotated, as in FIG. 18. In this configuration, a matched pair of 45 degree diagonal displacement PBDs 50, 51 are incorporated to economize on parts. This polarizer is effectively aligned at 45 degrees rather than 0 (or 90) degrees. As a result, the rubbing direction of the LC-SLM 53 is 30 degrees. The corresponding states of polarization at different locations within the LC-SLM subassembly are depicted in FIG. 19.

EXAMPLE 5

Achromatic and Athermal Optical Switch

The immediately previous examples describe LC-SLM applications in which the modulator elements are located in the image plane, wherein the input beam is wavelength dispersed along the modulator axis, such that nominally only a narrow wavelength bin strikes an individual pixel. These devices comprise wavelength selective switches and attenuators. Achromatic waveplates are also applicable to wavelength insensitive switches, which is described next.

Typical fiberoptic switches utilize mechanical actuation to move one fiber into alignment with one or more other fibers. Alternately, liquid crystal elements can be used to attenuate and switch the outputs. Liquid crystal switch elements are both temperature and wavelength dependent. For example, the amount of extinction depends on optical wavelength. For switch applications, the desired level of extinction is >45 dB across the entire C-band and/or L-band. In a channel equalizer, each wavelength falls within a single pixel, such that in principle different voltages can be applied across the array to maintain high extinction. However, for a wavelength independent switch, all wavelengths within the transmission band pass through the same pixel. To drive the cell to extinction for all wavelengths, the liquid crystal module must therefore be designed to be achromatic. The same waveplate compensator configurations of examples 1 and 2 apply to this situation.

EXAMPLE 6

Athermal Compensator and LC-SLM

The high extinction state is ideally independent of temperature. Liquid crystals typically exhibit a dependence of birefringence on temperature because the order parameter decreases with temperature up to the clearing point. If the liquid crystal is designed such that at high voltage the LC retardation is nearly equal to zero, then the total retardation is provided by the compensator wave plate assembly. The compensator wave plates are true zero order wave plates fabricated from crystalline quartz. Quartz has a birefringence in the 1500 to 1600 nm wavelength range of 0.008. Therefore, a quarter wave plate optimized for 1550 nm is nominally 45 um thick, and a half wave plate optimized for 1550 nm is nominally 90 um thick. The linear expansion coefficient of quartz is 7.5 ppm/° C. (a axis) and 14 ppm/° C. (c axis), and the change in birefringence with temperature is approximately 0.63 ppm/° C. To maintain the extinction above 40 dB, the birefringence must be constant to within about +/−0.2 nm. For a 75 degree celsius temperature excursion, the birefringence of a mechanically unclamped, zero order quartz half wave plate, $\Gamma(nm)=\delta\Delta n/\delta/L+\Delta n\ \delta L/\delta T$, varies by only about 0.1 nm.

To minimize stress induced birefringence changes on the quartz waveplates, these optical elements must be mounted to a carrier closely matched in thermal expansion to the quartz (within 1 ppm/° C.). Typical ceramic or metallic carriers exhibit isotropic thermal expansion characteristics. Since quartz exhibits different thermal expansions along the c and a axes, bonding locations must be selected along a particular mechanical axis of the waveplate oriented such that it matches the thermal expansion of the carrier. For example, a stainless steel carrier with thermal expansion of $12\ 10^{-6}/°$ C. may be epoxy attached to the waveplate at those two points where the c axis of the quartz intersects with the periphery of the waveplate. This mounting approach is appropriate for mounting both the compensating plate and flattening waveplate. Since the attachment points are mounted along a single polarized axis, and the thermal expansion of the wave plate along this axis is matched to the thermal expansion of the carrier to within 1 ppm/° C., the mounting is thermally stable. Note that in prior art cell designs the compensator plate is typically mounted to the front face of the liquid crystal cell with index matched epoxy, where the glass cell has isotropic thermal expansion characteristics not well matched to quartz. This mismatch results in the buildup of stress birefringence within the compensator waveplate which changes the orientation of the birefringence vector with operating temperature. This orientation change causes the extinction ratio to degrade with operating temperature, in a manner which can not be pulled out by reoptimizing the drive voltages.

Figure 20:
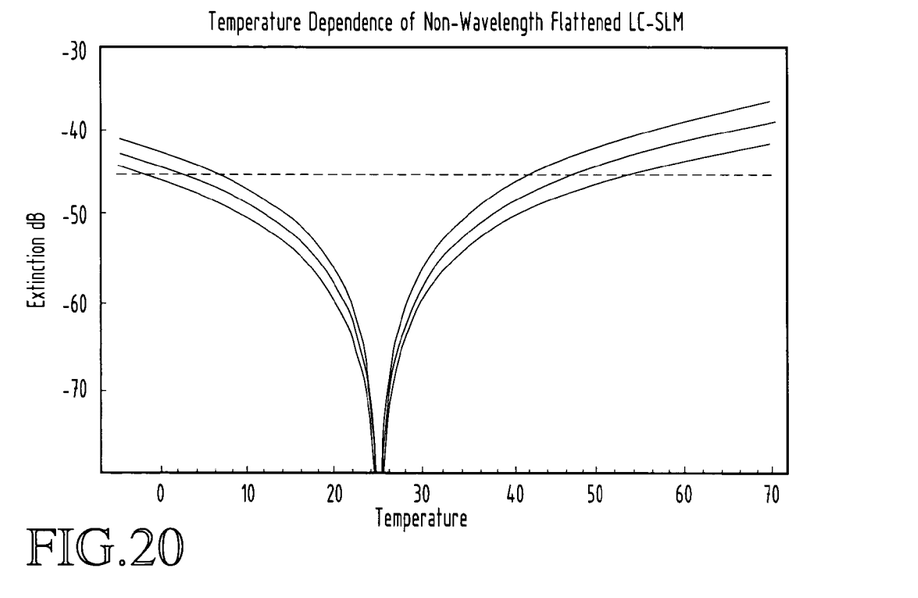
FIGS. 20 and 21 are graphs of the temperature dependence of non-wavelength flattened LC-SLMs, in terms of extinction and attenuation, respectively, relative to temperature.
Figure 21:
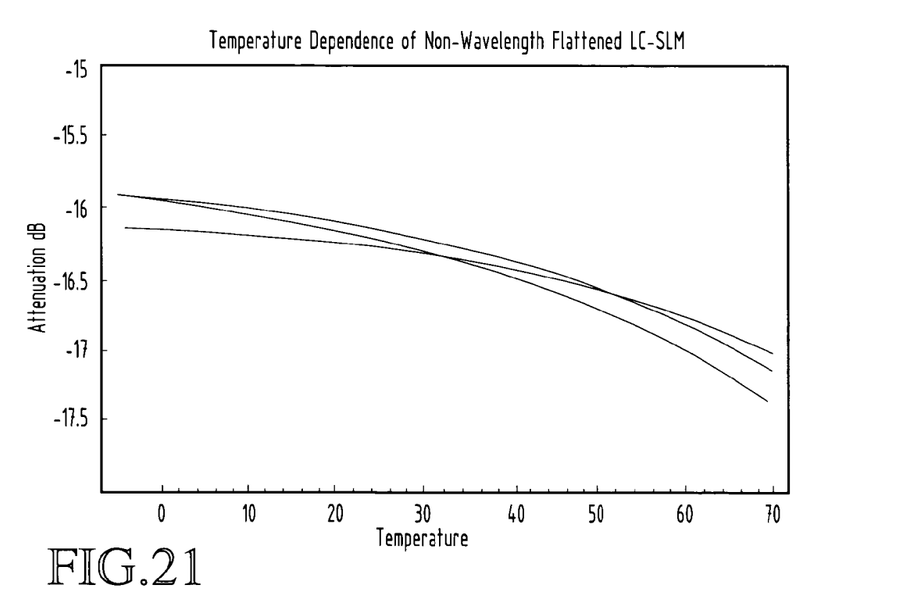

There are two compensator designs to consider. The compensator approach used in state of the art LC-SLMs use a true zero order quartz quarter wave plate aligned parallel to the optical axis of the LC-SLM. This quarter wave plate includes a small additional amount of birefringence to cancel the residual birefringence of the LC in the high voltage state. An undesired characteristic of this compensator is the resulting wavelength dependence of the high extinction state. Each wavelength pixel requires a different set point voltage across the LC to achieve high extinction. The maximum extinction responses over temperature for the three wavelength channels (1530, 1547, 1565 nm) are illustrated in FIG. 20. The voltage settings for each channel are optimized independently such that each wavelength passes through the maximum extinction value at room temperature (25° C.). This graph also assumes correct alignment and retardation of the wave plates. Note that the extinction is reduced to about 35 dB at the upper temperature extreme. FIG. 21 illustrates the attenuation response in the variable attenuation mode, for a particular attenuation setting. Again, each wavelength channel requires a different voltage setting to achieve the same nominal attenuation level. The responses do not follow the same curve over temperature. This adds complexity when attempting to factor out temperature and wavelength dependence.

Figure 22:
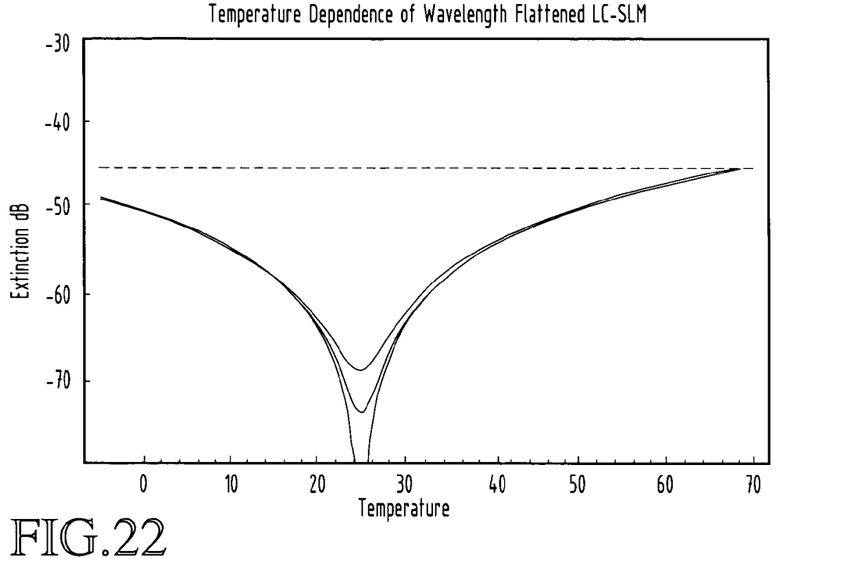
FIGS. 22 and 23 are graphs of temperature dependence of wavelength flattened LC-SLMs with respect to extinction and attenuation, respectively, in relation to temperature, respectively.

The invention described herein is a wavelength flattened compensator which also exhibits athermal characteristics. In this approach, the retardation in the high extinction state, for all wavelengths, arises from the double pass birefringence of the quarter and half wave plate combination. As illustrated in FIG. 22, the extinction for this design remains above 45 dB over the −5 to 70° C. operating range. This is a clear improvement over the single quarter wave plate compensator; the high extinction state is sufficiently athermalized by utilizing quartz wave plates. Since the response is wavelength flattened, the same voltage can be applied to each liquid crystal pixel to give the same response.

Figure 23:
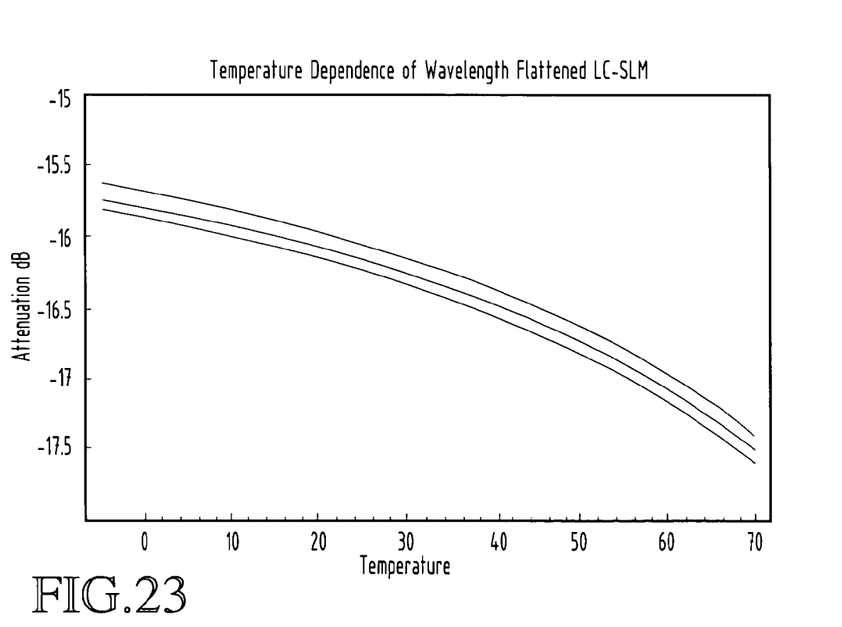

Fiberoptic components incorporating liquid crystals operate not only as switches which require >45 dB extinction, but also as variable attenuators. Therefore, it is also important to minimize the temperature dependence when setting the device to a particular attenuation state. FIG. 23 illustrates the transmission response of the wavelength flattened, athermal compensator assembly in the variable attenuation mode of operation. At −15 dB attenuation, the compensator/LC exhibit approximately +/−0.1 dB of attenuation variation with wavelength when driven at the same voltage. The attenuation increases by approximately 2 dB as the temperature is increased from −5 to 70° C. Since the cell response is also wavelength flattened, the attenuation is nearly independent of wavelength (to within +/−0.1 dB). One advantage apparent from FIG. 23 is the well-behaved functional dependence of attenuation on temperature. This feature allows the residual temperature dependence to be more readily factored out, since the temperature dependence is to first order wavelength independent.

EXAMPLE 7

High Reliability LC-SLM

Figure 24:
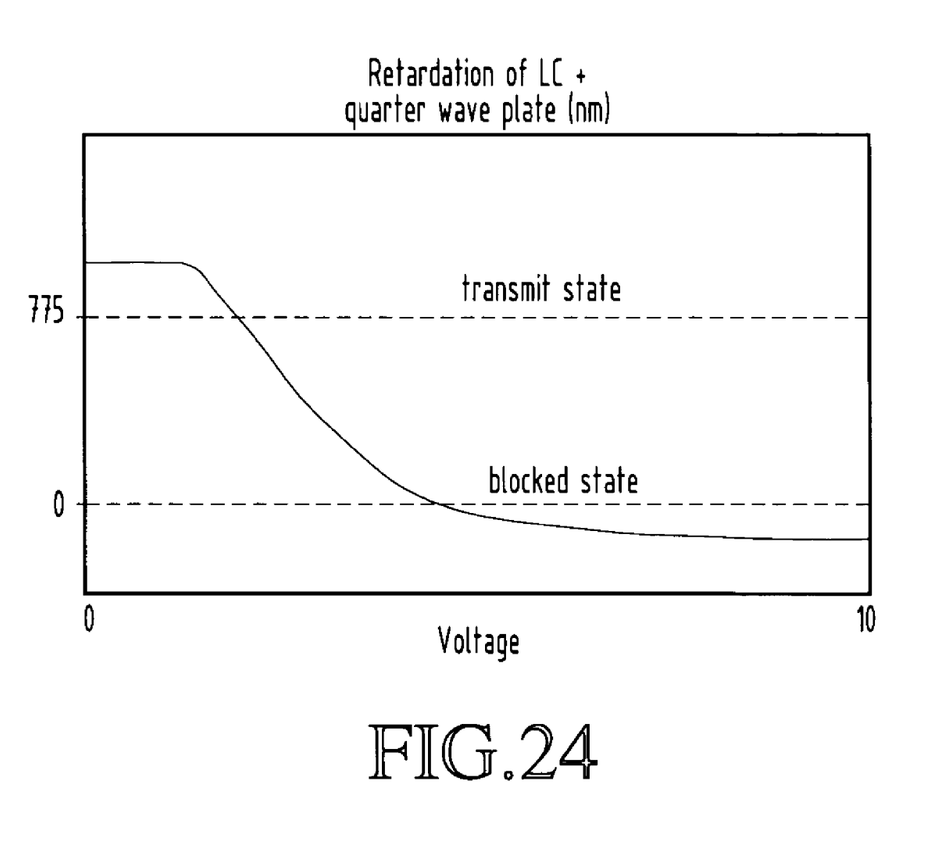
FIG. 24 is a graph of the retardation of an LC and quarter waveplate with respect to voltage in prior art devices, useful in explaining how the present invention provides high reliability in LC-SLMs

Fiberoptic elements for telecommunications applications must meet demanding reliability requirements. For example, the optical characteristics of the high extinction state should be maintained over the operating lifetime of the device. The retardation in the high extinction state is 387.5 nm for 1550 mn. To maintain >45 dB extinction, the retardation should be stable to the 500 ppm level over the lifetime of the device. Therefore, it is necessary to ensure that this retardation is provided in a robust manner. In this invention, the retardation in the block state is provided primarily by quartz waveplates alone. The great dimensional stability of this material ensures that the retardation remains constant. Whereas prior art devices typically exhibit a retardation response like that illustrated in FIG. 24, the block state includes significant contributions to the retardation from both the liquid crystal and the quartz compensator plate and reliability therefore is diminished.

The retardation of the liquid crystal is highly dependent on the liquid crystal gap thickness, which is nominally 5 um. This gap thickness may vary slightly over the lifetime of the device due to aging of the LC-SLM. However, by operating the LC-SLM in the highly driven state, the birefringence of the cell is nearly zero, so these aging effects are less significant. A more reliable LC-SLM modulator exhibits the response illustrated in FIG. 12, which has a much smaller residual birefringence originating from the LC in the high extinction state. Of course, the variable attenuation states will still include the aging effects of the liquid crystal cell, even when the flattened quartz compensating assembly is utilized.

To summarize, the invention described herein includes devices and methods which achieve achromatic and athermal optical performance characteristics in LC based optical components and instruments. This is achieved by a unique quartz multi-wave plate compensator design combined with a variable LC retarder. The reduction of wavelength and temperature dependence enables fiberoptic components of enhanced performance and reduced complexity.

Although a number of forms and expedients have been shown and described, the invention is not limited thereto but includes all modifications and variations within the scope of the appended claims.

The invention claimed is:

1. An optical communications device for selectively modifying a multiwavelength optical beam having a selected polarization with a given center wavelength and edge wavelengths, while compensating for nonlinearities at the edge wavelengths which affect data reliability, comprising: a voltage controlled liquid crystal cell functioning as an optical modulator receiving the optical beam and introducing a selectively controllable amount of retardation in the beam; and at least three retardation compensators in the path of the beam prior to the optical modulator, the at least three retardation compensators comprising at least one optical half wave quartz wave plate at the center wavelength, at least one nominally quarter wave plate that is identically equal to a quarter wave at the center wavelength and a third quartz plate of less than a tenth wave at the center wavelength to compensate for the residual cell birefringence, said optical wave plates providing integer multiples of retardation selected in relation to the center wavelength and edge wavelengths of the optical beam and a retardation characteristic of the optical modulator, each said wave plate having selected optical axis dispositions relative to the polarization axis of the optical beam.

2. A device as set forth in claim 1 above, wherein the device further comprises a polarizer in the optical path before the retardation compensators for assuring the direction of the polarization of the input beam, the axis of the liquid crystal cell is at a selected angle to the input beam polarization and the optical axis of the half wave plate is at an angle of about 15 degrees to the optical axis of the nominally quarter wave plate.

3. A device as set forth in claim 2 above, wherein the polarizer is a single element for transmitting an optical beam of preferred polarization.

4. A device as set forth in claim 2 above, wherein the polarizer comprises at least one polarization beam displacer.

5. A device as set forth in claim 1 above wherein the device comprises an array including a multiplicity of aligned liquid crystal cells each having independent controls and the retardation compensators are in the path of each cell, and compensate for nonlinearities at the edge wavelengths.

6. A device as set forth in claim 5 above wherein the wavelength band of interest is the C band with center wavelength of 1550 nm and edge wavelengths of 1530 nm and 1565 nm, and the device further comprises a system for diffractively separating a WDM input signal with separate wavelength signals.

* * * * *